United States Patent [19]

Iwata et al.

[11] Patent Number: 5,700,575
[45] Date of Patent: Dec. 23, 1997

[54] WATER-INSOLUBLE AMMONIUM POLYPHOSPHATE PARTICLES

[75] Inventors: Masuo Iwata; Mika Seki; Kouji Inoue, all of Kanagawa; Ryoji Takahashi, Tokyo; Tikashi Fukumura; Masaya Tanaka, both of Fukuoka, all of Japan

[73] Assignee: Chisso Corporation, Osaka, Japan

[21] Appl. No.: 362,974

[22] Filed: Dec. 23, 1994

[30] Foreign Application Priority Data

| Dec. 27, 1993 | [JP] | Japan | 5-354191 |
| Apr. 1, 1994 | [JP] | Japan | 6-087686 |
| Apr. 6, 1994 | [JP] | Japan | 6-093721 |
| Apr. 7, 1994 | [JP] | Japan | 6-095623 |

[51] Int. Cl.$^6$ ............................. B32B 5/16
[52] U.S. Cl. ............ 428/403; 428/407; 428/920; 524/415; 524/416
[58] Field of Search ............ 428/403, 407, 428/920, 921; 524/100, 415, 416; 523/205, 208, 179

[56] References Cited

U.S. PATENT DOCUMENTS

| 3,562,197 | 2/1971 | Sears et al. | 524/415 |
| 4,193,945 | 3/1980 | Bertelli et al. | 525/2 |
| 4,198,493 | 4/1980 | Marciandi | 525/164 |
| 4,467,056 | 8/1984 | Staendeke et al. | 523/208 |
| 4,504,610 | 3/1985 | Fontanelli et al. | 524/96 |
| 4,515,632 | 5/1985 | Maurer et al. | 106/18.16 |
| 4,719,045 | 1/1988 | Ogawa et al. | 252/609 |
| 4,727,102 | 2/1988 | Scarso | 524/100 |
| 4,871,795 | 10/1989 | Pawar | 524/267 |
| 5,109,037 | 4/1992 | Chakrabarti et al. | 523/202 |
| 5,430,080 | 7/1995 | Iwata et al. | 524/100 |

FOREIGN PATENT DOCUMENTS

| 0014463 | 8/1980 | European Pat. Off. . |
| 0180795 | 5/1986 | European Pat. Off. . |
| 0326082 | 8/1989 | European Pat. Off. . |
| 0459951 | 12/1991 | European Pat. Off. . |
| 0475418 | 3/1992 | European Pat. Off. . |
| 0614936 | 9/1994 | European Pat. Off. . |
| 0627460 | 12/1994 | European Pat. Off. . |
| 52-39930 | 10/1977 | Japan . |
| 52-39931 | 10/1977 | Japan . |
| 59376 | 1/1993 | Japan . |

OTHER PUBLICATIONS

WPI/Derwent, Abstract No. 91-206863, "Fire Retardant Composition . . . of Triazine Derivatives" of (Japanese Patent Document No. JP-A-6 056 988) Mar. 1994.

*Primary Examiner*—H. Thi Le
*Attorney, Agent, or Firm*—Leydig, Voit & Mayer, Ltd.

[57] ABSTRACT

Water-insoluble ammonium polyphosphate particles are provided which include melamine-coated ammonium polyphosphate particles with the surface thereof being crosslinked by a reaction between the melamine of the melamine-coated ammonium polyphosphate particles and a crosslinking agent having a functional group capable of reacting with the active hydrogen atoms belonging to the amino group in the melamine molecule.

12 Claims, 2 Drawing Sheets

5,700,575

WATER-INSOLUBLE AMMONIUM POLYPHOSPHATE PARTICLES

FIELD OF THE INVENTION

This invention relates to a flame-retardant thermosetting resin composition containing a non-halogen type flame-retardant. More particularly, it relates to a flame-retardant thermosetting resin composition having high water resistance and excellent mechanical properties which contains, is a non-halogen type flame-retardant, (1) melamine-coated ammonium polyphosphate particles and/or (2) water-insoluble ammonium polyphosphate particles. This invention further relates to water-insoluble ammonium polyphosphate particles and a process for producing the same. More particularly, it relates to water-insoluble ammonium polyphosphate particles having improved stability against hydrolysis as compared with ammonium polyphosphate and to a process for producing the same.

BACKGROUND OF THE INVENTION

Thermosetting resins such as epoxy resins, urethane resins and phenolic resins possess excellent heat resistance and mechanical strength and have therefore been used extensively, for example, as a molding material for electric and electronic parts, constructional materials and automobile parts, a coating, an adhesive, and an impregnating resin for impregnated paper. Flame retardation of these thermosetting resins has been achieved generally by addition of a halogen-containing organic compound or by halogenating part of the polymer chain. However, halogen-containing thermosetting resin compositions generate a corrosive halogenous gas on combustion, which has given rise to a problem. Ammonium polyphosphate has been proposed as a halogen-free flame-retardant, but it is very susceptible to hydrolysis because of its chemical structure so that molded articles obtained from a resin composition containing ammonium polyphosphate suffer from elution or bleeding of the ammonium polyphosphate under high temperature high humidity. It has also been pointed out that compounding of such an inorganic compound as ammonium polyphosphate leads to reduction of mechanical properties of the resin composition. It has, therefore, been demanded to develop a flame-retardant thermosetting resin composition containing a flame-retardant, which produces no halogenous gas on combustion, is not eluted, does not bleed out, and causes little reduction in mechanical characteristics of the resin.

In order to meet the demand, a resin composition containing a metal hydrate as an inorganic flame-retardant has been proposed as disclosed in JP-A-3-190965 (the term "JP-A" as used herein means an "unexamined published Japanese patent application"), in which the metal hydrate undergoes an endothermic decomposition and dehydration reaction at the combustion temperature of the resin composition, thereby suppressing combustion of the resin composition. However, since the flame retarding effect of the metal hydrate is very weak, desired flame retardation cannot be achieved unless it is used in a large quantity, and addition of a large quantity of the metal hydrate results in reduction in moldability of the resin composition and reduction in mechanical strength of molded articles of the resin composition.

JP-A-4-227923 discloses an epoxy resin composition, which is flame retarded with a carbon-forming, non-halogen type flame-retardant containing ammonium polyphosphate, but the ammonium polyphosphate used is, conventional one, which is highly water-soluble and easily hydrolyzable.

On the other hand, JP-A-1-108261 discloses a flame-retardant polymer composition containing synthetic resin-coated ammonium polyphosphate particles, and JP-A-5-9376 describes a flame-retardant urethane resin composition containing ammonium polyphosphate particles, which are encapsulated by a melamine-formaldehyde resin or an epoxy resin. In these compositions, since the ammonium polyphosphate particles are coated or encapsulated with a synthetic resin, it seems that ammonium polyphosphate is prevented from being eluted and, thereby, from bleeding, but the publications make no mention of it. Further, the synthetic resin coat covering the individual ammonium polyphosphate particles is a cured resin and is no longer reactive. Therefore, when added to a thermosetting resin, such a synthetic resin coat has poor compatibility with the thermosetting resin so that the resulting flame-retardant resin composition only provides molded articles having reduced mechanical strength.

With respect to improving the stability of ammonium polyphosphate to hydrolysis, JP-B-53-15478 (the term "JP-B" as used herein means an "examined published Japanese patent application") discloses a process for obtaining modified ammonium polyphosphate comprising condensing ammonium phosphate and urea or crystalline urea phosphate while heating in the presence of 5 to 50% by weight, in terms of melamine, of melamine or melamine phosphate. However, the modified ammonium polyphosphate obtained by the process disclosed still has insufficient stability against hydrolysis for use as a component of a flame retardant for thermoplastic resins, thermosetting resins, coatings, flame-retardant paper; etc.

JP-B-52-39930 discloses a process for obtaining melamine-added ammonium polyphosphate powder comprising uniformly mixing 100 parts by weight of ammonium polyphosphate and 60 parts by weight of melamine, heating the mixture at 320° C., cooling the heated product, and grinding the resulting fused product. However, because a product having been once fused is ground to powder, the resulting ammonium polyphosphate particles are not uniformly coated with melamine and are, therefore, still susceptible to hydrolysis.

JP-A-61-103962 proposes a process for producing a finely divided and flowable flame-retardant mainly comprising powdered ammonium polyphosphate having hydrolysis stability, which process comprises preparing a suspension from ammonium polyphosphate, water, an organic suspending agent, and a melamine formaldehyde resin, heating the suspension at a temperature of 50° to 180° C. under standard pressure or under a higher pressure, and leaving the suspension to stand for 15 to 240 minutes to allow the resin component to harden. However, not only does the finely divided flame-retardant obtained have insufficient hydrolysis stability, but the particles undergo agglomeration during hardening of the resin component in the suspension, resulting in an increase of particle size. Therefore, no matter how fine the starting ammonium polyphosphate particles are, the initial particle size of the ammonium polyphosphate can hardly be maintained in the resulting flame-retardant. Such a finely divided flame-retardant, when added to thermoplastic resins, thermosetting resins, coatings or paper, causes reduction in mechanical strength of the final products.

SUMMARY OF THE INVENTION

Accordingly, an object of the present invention is to provide a thermosetting resin composition, which exhibits excellent flame retardancy as well as heat resistance and mechanical strength, without suffering from elution or bleeding of a flame-retardant compounded therein and is, therefore, suitable as a molding material for electric and electronic parts, constructional materials and automobile parts, a coating, an adhesive, and an impregnating resin for impregnated paper.

The present inventors have conducted extensive investigations to obtain a flame-retardant thermosetting resin composition containing a flame-retardant, which produces no halogenous gas on combustion, is not eluted, does not bleed out, and causes little reduction in mechanical properties of the resin composition. As a result, they have found that a flame-retardant thermosetting resin composition meeting the above object is obtained by using, in place of the conventional ammonium polyphosphate particles, (1) melamine-coated ammonium polyphosphate particles in which melamine is added and/or adhered onto the surface of ammonium polyphosphate particles by sublimation and/or (2) water-insoluble ammonium polyphosphate particles obtained by crosslinking the surface of the above-mentioned melamine-coated ammonium polyphosphate particles with a compound having a functional group capable of reacting with active hydrogen atoms belonging to the amino group in the melamine molecule present in the melamine of the melamine-coated ammonium polyphosphate particles, which compound may be called "a crosslinking agent". The present invention has been completed based on this finding.

The present invention provides a flame-retardant thermosetting resin composition comprising a thermosetting resin and from 4 to 50% by weight, based on the composition, of either one or both of (1) melamine-coated ammonium polyphosphate particles and (2) water-insoluble ammonium polyphosphate particles obtained by crosslinking the surface of melamine-coated ammonium polyphosphate particles with a compound having a functional group capable of reacting with active hydrogen atoms belonging to the amino group in the melamine molecule.

The flame-retardant thermosetting resin composition according to the present invention includes the following embodiments (1) to (7):

1) The thermosetting resin contains a glycidyl group, an isocyanate group, a methylol group or an aldehyde group.
2) The melamine-coated ammonium polyphosphate particles comprise powdered ammonium polyphosphate coated with 0.5 to 20% by weight of melamine.
3) The melamine-coated ammonium polyphosphate particles are those obtained by sublimating melamine to add and/or adhere melamine onto the surface of ammonium polyphosphate particles.
4) The compound having a functional group capable of reacting with active hydrogen atoms belonging to the amino group in the melamine molecule has an isocyanate group, a glycidyl group, a carboxyl group, a methylol group or an aldehyde group.
5) The compound having a functional group capable of reacting with active hydrogen atoms belonging to the amino group in the melamine molecule has two or more functional groups.
6) The melamine-coated ammonium polyphosphate particles and the water-insoluble ammonium polyphosphate particles have an average particle size of not greater than 15 µm.
7) The thermosetting resin is an epoxy resin, a rigid urethane resin, a soft urethane resin, a phenolic resin, a melamine resin, a guanamine resin, a xylene resin or a urea resin.

Another object of the present invention is to provide ammonium polyphosphate particles, which are excellent in stability to hydrolysis and, when added as a flame-retardant component to thermoplastic resins, thermosetting resins, coatings, paper; etc., cause no reduction in mechanical strength of the final products, and a process for producing such ammonium polyphosphate particles.

The present inventors have conducted extensive investigations to obtain ammonium polyphosphate particles, which are excellent in stability to hydrolysis and, when added as a flame-retardant component to thermoplastic resins, thermosetting resins, coatings, paper; etc., cause no reduction in mechanical strength of the final products. As a result, they have found that the above object is achieved by water-insoluble melamine-coated ammonium polyphosphate particles having an average particle size of not more than 15 µm, in which the surface of the melamine-coated ammonium polyphosphate particles is crosslinked with a crosslinking agent having a functional group capable of reacting with active hydrogen atoms belonging to the amino groups of the melamine molecule present in the melamine coat. They have also found that such water-insoluble ammonium polyphosphate particles can be produced by crosslinking the melamine molecules in the melamine coat of melamine-coated ammonium polyphosphate particles with a crosslinking agent having a functional group capable of reacting with active hydrogen atoms belonging to the amino group in the melamine molecule. The present invention has been completed based on these findings.

The present invention also provides water-insoluble ammonium polyphosphate particles comprising melamine-coated ammonium polyphosphate particles with the surface thereof being crosslinked by a reaction between the melamine on the surface of the melamine-coated ammonium polyphosphate particles and a crosslinking agent having a functional group capable of reacting with the active hydrogen atoms belonging to the amino group in the melamine molecule.

The water-insoluble ammonium polyphosphate particles according to the present invention include the following embodiment:

An average particle size of the water-insoluble ammonium polyphosphate particles is not more than 15 µm.

The present invention further provides a process for producing water-insoluble ammonium polyphosphate particles comprising adhering or impregnating a crosslinking agent having a functional group capable of reacting with the active hydrogen atoms belonging to the amino group in melamine molecule to or into the surface of melamine-coated ammonium polyphosphate particles and allowing the melamine of the melamine coat and the crosslinking agent to react.

The process for producing water-insoluble ammonium polyphosphate particles according to the present invention includes the following embodiment:

The functional group capable of reacting with the active hydrogen atoms belonging to the amino group in the melamine molecule is selected from the group consisting of an isocyanate group, a hydroxymethyl group, a formyl group and an epoxy group.

DETAILED DESCRIPTION OF THE INVENTION

Figure 1:
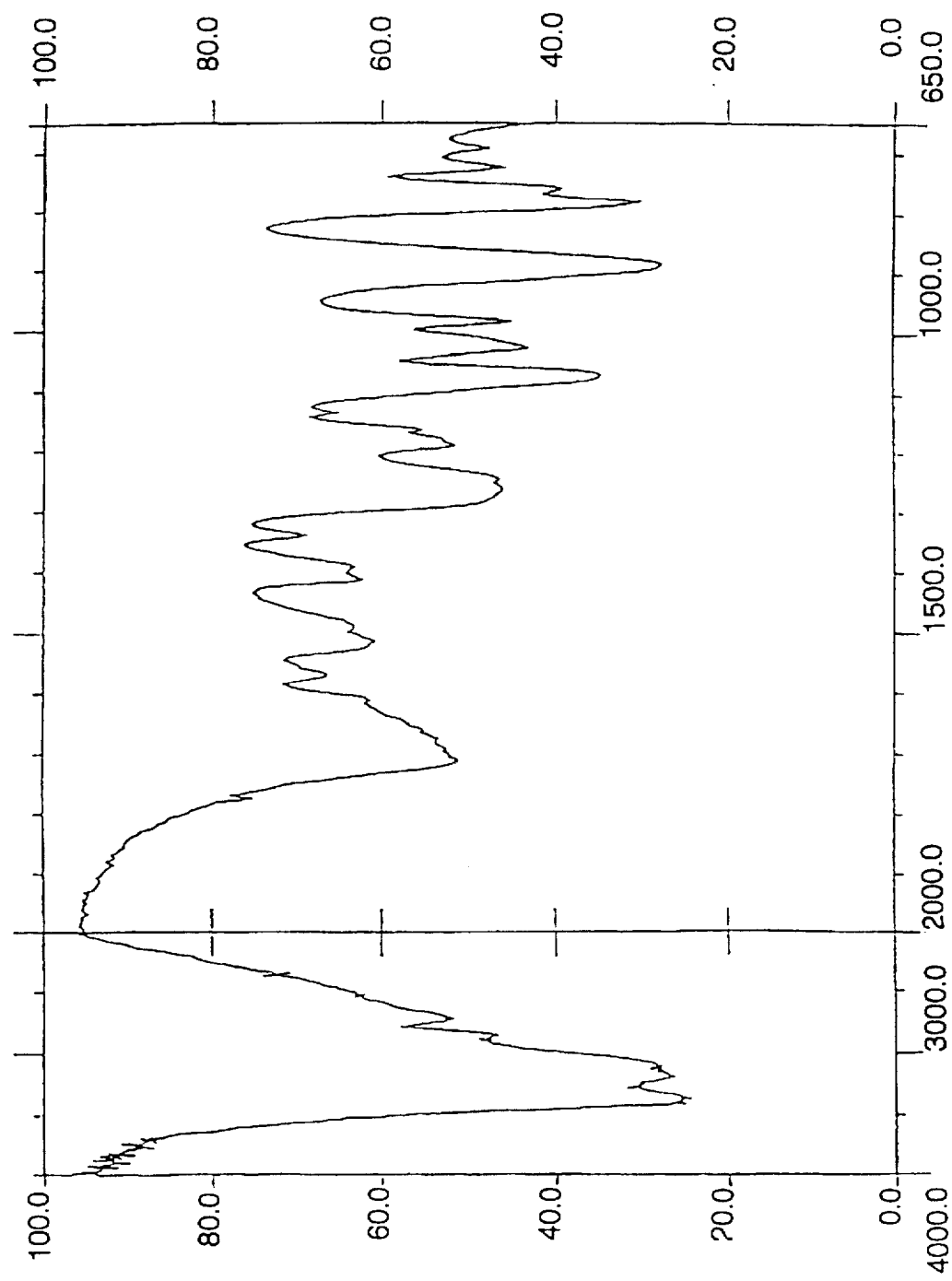
FIG. 1 shows an infrared absorption spectrum of the surface of the water-insoluble ammonium polyphosphate particle obtained in Example 15.

The melamine-coated ammonium polyphosphate particles which can be used in the present invention comprise particles of ammonium polyphosphate represented by formula (I):

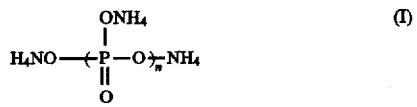

wherein n is an integer of 2 or greater, the particles being coated with melamine. The melamine-coated ammonium polyphosphate particles can be obtained by, for example, the following method. In the first stage, particles of ammonium polyphosphate of formula (I) are put in a preheated heating and kneading apparatus, such as a kneader, and heated at such a temperature that they easily release the ammonia content thereof without being melted, i.e., at 300° C. or lower, preferably from 200° to 300° C., for 0.5 to 5 hours. Thus, part of ammonia originally present in the ammonium polyphosphate in a stoichiometric amount is released (i.e., 5 to 10% by weight based on the stoichiometric amount of ammonia is released) to provide ammonium polyphosphate particles from which part of the ammonia content has been removed, whose 1% by weight aqueous suspension has a pH of 4.0 to 6.0, or ammonium polyphosphate particles in which the combined ammonia content is smaller than the stoichiometric amount in a known process for ammonium polyphosphate production (as disclosed in U.S. Pat. Nos. 4,396,586 and 5,213,783). These ammonium polyphosphate particles will hereinafter be referred to as ammonia-deficient ammonium polyphosphate particles. In the second stage, the ammonia-deficient ammonium polyphosphate particles are heated in the same apparatus at such a temperature that they are not melted and that melamine is capable of sublimation, i.e., at 350° C. or lower, preferably from 250° to 300° C., at which temperature melamine is added thereto. Thus, melamine is sublimed and is added and/or adhered to the surface of the ammonia-deficient ammonium polyphosphate particles. The terminology "added" as used herein means that melamine is chemically bonded to the proton of the oxygen-proton bond originated from the release of ammonia from ammonium polyphosphate. The "added" melamine is thermally stable and is never released again by heating. The terminology "adhered" as used herein means that melamine is adsorbed on the surface of ammonium polyphosphate particles. On continuation of heating, the melamine adsorbed on the surface of the particles alternates between sublimation and adsorption repeatedly and is meanwhile chemically bonded to the proton of the oxygen-proton bond. The proportion of the melamine to be charged is from 0.5 to 20% by weight, preferably from 2 to 15% by weight, more preferably 2 to 10% by weight, based on the ammonium polyphosphate particles. All the melamine charged is added and/or adhered onto the surface of the ammonium polyphosphate particles to obtain melamine-coated ammonium polyphosphate particles according to the present invention.

Commercially available grades of ammonium polyphosphate may be utilized as starting ammonium polyphosphate particles. Examples of suitable grades include SUMISAFE-P (produced by Sumitomo Chemical Co., Ltd.), EXOLIT-422 or 700 (both produced by Hoechst AG), and PHOS-CHECK P/40 (produced by Monsanto Co., Ltd.). Ammonium polyphosphate (crystal form II) fine particles, as described in JP-A-4-300204 (corresponding to U.S. Pat. No. 5,213,783), are also useful. The ammonium polyphosphate (crystal form II) fine particles can be obtained, for example, as follows. Equimolar amounts of diammonium hydrogenphosphate and phosphorus pentoxide ($P_2O_5$) are mixed together, and the mixture is heated to a temperature of 290° to 300° C. with stirring. A 77% by weight urea solution containing urea in an amount 0.5 times the molar quantity of the diammonium hydrogenphosphate is then added thereto by spraying, and the mixture is subsequently heated in an ammonia atmosphere at 250° to 270° C. for several hours.

The melamine to be used in the present invention may be any of commercial products available as a melamine monomer.

The water-insoluble ammonium polyphosphate particles (hereinafter sometimes referred to simply as particles (2)) which can be used in the present invention comprise the above-mentioned melamine-coated ammonium polyphosphate particles (hereinafter sometimes referred to simply as particles (1)) with the melamine molecules in the melamine coat thereof being crosslinked with a compound having a functional group capable of reacting with active hydrogen atoms belonging to the amino group in the melamine molecules (hereinafter simply referred to as a functional group-containing compound). The particles (2) having such a structure are prepared, for example, by mixing the particles (1) and a functional group-containing compound, such as a formaldehyde aqueous solution, in a reactor equipped with a heating means and a stirring means or a kneading means, and heating the mixture to a temperature at which a crosslinking reaction among active hydrogen atoms easily takes place, i.e., at 80° to 200° C., preferably 100° to 150° C., for 0.5 to 2 hours. In the above-mentioned method, since monomolecules or individual molecules are used as the functional group-containing compound, the crosslinking reaction preferentially takes place on the individual melamine-coated ammonium polyphosphate particles without agglomeration of the particles occurring through the functional group-containing compound. The crosslinking reaction may be effected either with or without a solvent. Water, organic solvents or mixtures of two or more thereof may be used as a solvent. The functional group-containing compound is used in an amount of from 0.5 to 6 equivalents, preferably 1 to 2 equivalents, in terms of the functional groups per the amino group of melamine molecules of the melamine coat of the particles (1). If the proportion of the functional group is less than 0.5 equivalent, the crosslinking among melamine molecules is not sufficient and provides melamine-coated ammonium polyphosphate particles susceptible to hydrolysis. If the proportion of the functional group is larger than 6 equivalents, the excess remains unreacted in the reaction mixture. The functional groups capable of reacting with active hydrogen atoms belonging to the amino group in a melamine molecule include an isocyanate group, a hydroxymethyl group, a formyl group, and an epoxy group. Examples of compounds containing one or more functional groups include those having an isocyanate group(s), such as 1,6-hexane diisocyanate, 1,1'-methylenebis(4-phenyl isocyanate), 3,3'-dimethyldiphenyl-4,4'-diisocyanate, and naphthylene-1,5-diisocyanate; those having a methylol group, such as methylol urea, methylol melamine, trimethylolethane, and trimethylolpropane; those having an aldehyde group, such as formaldehyde, malonaldehyde, and glyoxal; those having an epoxy group, such as ethylene glycol diglycidyl ether, glycerol polyglycidyl ether, and various epoxy resins, e.g., bisphenol A type epoxy resins, phenol novolak epoxy resins, and cyclic aliphatic epoxy resins. All the available commercial products may be utilized. When the water-insoluble polyphosphate particles are added to the thermosetting resin, the functional groups capable of reacting with active hydrogen atoms belonging to the amino group in a melamine molecule include an isocyanate group, a glycidyl group, a carboxyl group, a methylol group, and an aldehyde group. The functional group-containing compound may have one or more than one functional groups. Specific examples of the functional group-containing compound include those having an isocyanate group, such as hexamethylene diisocyanate and toluene diisocyanate; those having a glycidyl group, such as various epoxy resins, e.g., bisphenol A and phenol novolak; those having a carboxyl group, such as oxalic acid, malonic acid and phthalic acid; those having a methylol group, such as trimethylolpropane and trimethylolethane; and those having an aldehyde group, such as formaldehyde, glyoxal, and malonaldehyde.

The melamine-coated ammonium polyphosphate particles (1) and/or water-insoluble ammonium polyphosphate particles (2) are used in an amount of from 4 to 50% by weight, preferably from 10 to 45% by weight, based on the weight of the thermosetting resin composition. If the amount of these flame-retardants is less than 3% by weight, sufficient flame retardancy cannot be obtained. If it exceeds 60% by weight, the resin composition suffers from considerable reductions in mechanical properties for the improvement in flame retardancy, failing to withstand practical use.

Suitable thermosetting resins, which can be applied to the present invention, include those having a glycidyl group, an isocyanate group, a methylol group or an aldehyde group. Preferred of these are epoxy resins, rigid urethane resins, soft urethane resins, phenolic resins, melamine resins, guanamine resins, xylene resins, and urea resins. Additionally, unsaturated polyester resins and diallyl phthalate resins are also suitable as thermosetting resins.

There are active hydrogen atoms belonging to the amino group of melamine molecules on the surface of the melamine-coated ammonium polyphosphate particles (1). In the water-insoluble ammonium polyphosphate particles (2), the active hydrogen atoms in the melamine molecules in the melamine coat of the particles (1) have been reacted with the functional group-containing compound to form a crosslinked structure among melamine molecules on the individual particles. The active hydrogen atom in the melamine molecules remains in the melamine coat of particles (2) as far as the degree of crosslinking among melamine molecules is moderately controlled. At the stage where the above-mentioned preferred thermosetting resin is cured, the residual active hydrogen atom of the particles (1) or (2) is reacted with such a functional group as a glycidyl group, an isocyanate group, a methylol group or an aldehyde group of the thermosetting resin to form a chemical bond between the particles (1) or (2) and the thermosetting resin. As a result, the particles (1) or (2) and the thermosetting resin exhibit markedly improved compatibility with each other, and addition of these particles brings about no serious reductions in mechanical properties.

If desired, the thermosetting resin composition according to the present invention may further contain other additives commonly employed for general thermosetting resins, such as curing agents, curing accelerators, other known flame-retardants, flame-retardant promoters, colorants, surface-active agents, heat stabilizers, plasticizers, photostabilizers, solvents, and the like.

The present invention will now be illustrated in greater detail with reference to examples, but it should be understood that the present invention is not construed as being limited thereto. All the percents, parts, and ratios are given by weight unless otherwise indicated.

Samples prepared in Examples and Comparative Examples were evaluated in accordance with the following test methods.

1) Flame Retardancy:
Flame retardancy was tested according to the vertical combustion test specified in "Combustion Test of Plastic Materials for Appliance Parts" in UL Subject 94 (Underwriters Laboratories Inc.). Test piece thickness: 1.6 mm (1/16 inch).

2) Oxygen Index (O.I.):
Oxygen Index (O.I.) was determined in accordance with JIS K7201 (Combustion Test Method for High Polymeric Materials by Oxygen Index Method).

3) Hot-Water Immersion Test:
A 100 mm long, 100 mm wide and 2 mm thick test piece was prepared by hot press molding, and the surface resistivity of the test piece was measured with a vibrating reed electrometer, manufactured by Takeda Riken Industry Co., Ltd. The test piece was immersed in hot water at 95° C. for 2 hours and taken out. The water on the test piece was wiped off with a wiping paper, and the surface resistivity was measured again. Samples, which underwent a considerable reduction in surface resistivity due to the immersion in hot water, were regarded as poor in bleed resistance.

4) Tensile Strength and Tensile Elongation:
Tensile Strength and Tensile Elongation were measured in accordance with JIS K7113 (Tensile Test Method for Plastics) using test pieces of 100 mm length, 20 mm width and 2 mm thickness.

5) Flexural Strength:
Flexural Strength was measured in accordance with JIS K7203 (Bending Test Method for Rigid Plastics) using test pieces of 100 mm length, 25 mm width and 2 mm thickness.

The melamine-coated ammonium polyphosphate particles used in the following examples were prepared by treating ammonium polyphosphate (crystal form II) fine particles as follows. In a kneader previously heated to 280° C. was charged 2000 g of ammonium polyphosphate (crystal form II) fine particles having an average particle size of 6.4 µm and heated with stirring for 3 hours in a nitrogen or inert gas atmosphere to release ammonia. To the resulting ammonia-deficient ammonium polyphosphate fine particles was added 200 g of melamine, and the mixture was heated and mixed at 280° C. for 4 hours with the top of the kneader closed, while maintaining the form of the ammonium polyphosphate particles. Thus, 2100 g of melamine-coated ammonium polyphosphate particles were obtained. Observation under an electron microscope revealed that the surface of the individual ammonium polyphosphate (crystal form II) fine particles is uniformly coated with melamine.

The ammonium polyphosphate (crystal form II) fine particles mentioned above were obtained by the following method. In a 5 l table kneader preheated to 290° to 300° C. were charged 660 g (5 mol) of diammonium hydrogenphosphate and 710 g (5 mol) of phosphorus pentoxide, and the mixture was heated with stirring in a nitrogen atmosphere. After 20 minutes, 195 g of a 76.9% urea solution heated to 80° C. was added thereto by spraying. Subsequently, the mixture was heated at 250° to 270° C. for 2.5 hours in an ammonia atmosphere to obtain 160 g of ammonium polyphosphate fine particles. Since the resulting fine particles was a mixture of primary particles and a small proportion of agglomerates, it was ground in a grinder AP-B Model, manufactured by Hosokawa Micron Corp., in an ammonia atmosphere so as to separate the agglomerates into primary particles. X-Ray diffractometry revealed that the resulting ammonium polyphosphate fine particles were of the crystal form II and had an average particle size of 6.4 µm.

EXAMPLE 1

A mixture of 71.2 parts of a bisphenol A type epoxy resin, EPIKOTE 828, produced by Yuka Shell Epoxy Co., Ltd., and 20 parts of melamine-coated ammonium polyphosphate was thoroughly dispersed, and 8.8 parts of diethylenetriamine was added thereto as a curing agent, followed by thorough mixing. After degassing, the mixture was heated at 30° C. for 60 minutes and hot press molded at 100° C. for 15 minutes to prepare a flat plate. Test pieces of prescribed sizes (hereinafter designated sample a) were cut out of the plate and subjected to a flame retardancy test, measurement of O.I., a hot-water immersion test, a tensile test, and a bending test. The results obtained are shown in Table 1.

EXAMPLE 2

Test pieces (hereinafter designated sample b) were prepared and tested in the same manner as in Example 1, except for using a resin composition consisting of 53.4 parts of EPIKOTE 828, 40 parts of melamine-coated ammonium polyphosphate particles, and 6.6 parts of diethylenetriamine. The results of the tests are shown in Table 1.

EXAMPLE 3

A mixture of 51 parts of a polyisocyanate compound DN-980S, produced by Dainippon Ink & Chemicals, Inc., 49 parts of a polyester polyol D-220, produced by Dainippon Ink & Chemicals, Inc., and 13 parts of melamine-coated ammonium polyphosphate was thoroughly mixed. After degassing, the mixture was hot press molded at 150° C. for 30 minutes to prepare a flat plate. Test pieces of prescribed sizes (hereinafter designated sample c) were cut out of the plate and subjected to a flame retardancy test, measurement of O.I., a hot-water immersion test, and a tensile test. The results obtained are shown in Table 2.

EXAMPLE 4

Test pieces (hereinafter designated sample d) were prepared and tested in the same manner as in Example 3, except for changing the amount of the melamine-coated ammonium polyphosphate particles to 20 parts. The results of the tests are shown in Table 2.

EXAMPLE 5

A mixture of 87 parts of a molding melamine resin (containing cellulose powder), produced by Fuji Kasei K.K., and 13 parts of melamine-coated ammonium polyphosphate particles was hot press molded at 165° C. for 4 minutes to prepare a flat plate. Test pieces of prescribed sizes (hereinafter designated sample e) were cut out of the plate and subjected to a flame retardancy test, measurement of O.I., a hot-water immersion test, a tensile test, and a bending test. The results obtained are shown in Table 3.

EXAMPLE 6

A mixture of 87 parts of a molding phenolic resin (containing cellulose powder), produced by Fudo K.K., and 13 parts of melamine-coated ammonium polyphosphate particles was hot press molded at 170° C. for 4 minutes to prepare a flat plate. Test pieces of prescribed sizes (hereinafter designated sample f) were cut out of the plate and subjected to a flame retardancy test, measurement of O.I., a hot-water immersion test, a tensile test, and a bending test. The results obtained are shown in Table 3.

EXAMPLE 7

A mixture of 94 parts of a molding phenolic resin (containing cellulose powder), produced by Fudo K.K., and 6 parts of melamine-coated ammonium polyphosphate particles was hot press molded at 170° C. for 4 minutes to prepare a flat plate. Test pieces of prescribed sizes (hereinafter designated sample g) were cut out of the plate and subjected to a flame retardancy test, measurement of O.I., a hot-water immersion test, a tensile test, and a bending test. The results obtained are shown in Table 3.

COMPARATIVE EXAMPLE 1

89 parts of a bisphenol A type epoxy resin EPIKOTE 828 and 11 parts of diethylenetriamine as a curing agent were mixed and degassed. The mixture was heated at 30° C. for 60 minutes and then hot press molded at 100° C. for 15 minutes to prepare a flat plate. Test pieces of prescribed sizes (hereinafter designated sample h) were cut out of the plate and subjected to a flame retardancy test, measurement of O.I., a hot-water immersion test, a tensile test, and a bending test. The results obtained are shown in Table 1.

COMPARATIVE EXAMPLE 2

Test pieces (hereinafter designated sample i) were prepared and tested in the same manner as in Example 1, except for replacing the melamine-coated ammonium polyphosphate particles with 20 parts of ammonium polyphosphate SUMISAFE-P, produced by Sumitomo Chemical Co., Ltd. The results of the tests are shown in Table 1.

COMPARATIVE EXAMPLE 3

Test pieces (hereinafter designated sample j) were prepared and tested in the same manner as in Example 1, except for replacing the melamine-coated ammonium polyphosphate particles with 20 parts of ammonium polyphosphate (crystal form II) fine particles. The results of the tests are shown in Table 1.

COMPARATIVE EXAMPLE 4

Test pieces (hereinafter designated sample k) were prepared and tested in the same manner as in Example 1, except for replacing the melamine-coated ammonium polyphosphate particles with 20 parts of ammonium polyphosphate EXOLIT-462, produced by Hoechst AG. The results of the tests are shown in Table 1.

COMPARATIVE EXAMPLE 5

Test pieces (hereinafter designated sample l) were prepared and tested in the same manner as in Example 1, except for replacing the melamine-coated ammonium polyphosphate particles with 80 parts of magnesium hydroxide KISUMA 5A, produced by Kyowa Kagaku Kogyo K.K. The results of the tests are shown in Table 1.

COMPARATIVE EXAMPLE 6

51 parts of polyisocyanate DN-980S and 49 parts of polyester polyol D-220 were mixed and degassed. The mixture was hot press molded at 150° C. for 30 minutes to prepare a flat plate. Test pieces of prescribed sizes (hereinafter designated sample m) were cut out of the plate and subjected to a flame retardancy test, measurement of O.I., a hot-water immersion test, and a tensile test. The results obtained are shown in Table 2.

COMPARATIVE EXAMPLE 7

Test pieces (hereinafter designated sample n) were prepared and tested in the same manner as in Example 3, except for replacing the melamine-coated ammonium polyphosphate particles with 20 parts of ammonium polyphosphate SUMISAFE-P. The results of the tests are shown in Table 2.

COMPARATIVE EXAMPLE 8

Test pieces (hereinafter designated sample p) were prepared and tested in the same manner as in Example 3, except for replacing the melamine-coated ammonium polyphosphate particles with 20 parts of ammonium polyphosphate (crystal form II) fine particles. The results of the tests are shown in Table 2.

COMPARATIVE EXAMPLE 9

Test pieces (hereinafter designated sample q) were prepared and tested in the same manner as in Example 3, except for replacing the melamine-coated ammonium polyphosphate particles with 100 parts of magnesium hydroxide KISUMA 5A. The results of the tests are shown in Table 2.

COMPARATIVE EXAMPLE 10

A molding melamine resin (containing cellulose powder), produced by Fuji Kasei K.K., was hot press molded at 165° C. for 4 minutes to prepare a flat plate. Test pieces of prescribed sizes (hereinafter designated sample r) were cut out of the plate and subjected to a flame retardancy test, measurement of O.I., a hot-water immersion test, a tensile test, and a bending test. The results obtained are shown in Table 3.

COMPARATIVE EXAMPLE 11

Test pieces (hereinafter designated sample s) were prepared and tested in the same manner as in Example 5, except for replacing the melamine-coated ammonium polyphosphate particles with 13 parts of ammonium polyphosphate SUMISAFE-P. The results of the tests are shown in Table 3.

COMPARATIVE EXAMPLE 12

A molding phenolic resin (containing cellulose powder), produced by Fudo K.K., was hot press molded at 170° C. for 4 minutes to prepare a flat plate. Test pieces of prescribed sizes (hereinafter designated sample t) were cut out of the plate and subjected to a flame retardancy test, measurement of O.I., a hot-water immersion test, a tensile test, and a bending test. The results obtained are shown in Table 3.

COMPARATIVE EXAMPLE 13

Test pieces (hereinafter designated sample u) were prepared and tested in the same manner as in Example 6, except for replacing the melamine-coated ammonium polyphosphate particles with 13 parts of ammonium polyphosphate SUMISAFE-P. The results of the tests are shown in Table 3.

TABLE 1

Epoxy Resin Composition

|  | Example 1 Sample a | Example 2 Sample b | Compara. Example 1 Sample h | Compara. Example 2 Sample i | Compara. Example 3 Sample j | Compara. Example 4 Sample k | Compara. Example 5 Sample l |
|---|---|---|---|---|---|---|---|
| Flame Retardancy |  |  |  |  |  |  |  |
| UL-94V 1.6 mm$^t$ | V-0 | V-0 | burning | V-0 | V-0 | V-0 | burning |
| O.I. 3.0 mm$^t$ | 32 | 36 | 20.0 | 29.5 | 30 | 30.5 | 25.9 |
| Surface Resistivity ($\Omega$): |  |  |  |  |  |  |  |
| Before hot water immersion | $8.2 \times 10^{16}$ | $3.6 \times 10^{16}$ | $4.2 \times 10^{16}$ | $4.7 \times 10^{15}$ | $3.8 \times 10^{14}$ | $2.8 \times 10^{15}$ | $1.8 \times 10^{16}$ |
| After hot water immersion | $2.6 \times 10^{15}$ | $1.7 \times 10^{15}$ | $5.0 \times 10^{15}$ | $1.4 \times 10^{8}$ | $3.1 \times 10^{8}$ | $5.1 \times 10^{15}$ | $6.3 \times 10^{15}$ |
| Bleed Resistance | good | good | good | poor | poor | good | good |
| Tensile Strength (kgf/cm$^2$) | 520 | 508 | 472 | 401 | 403 | 400 | 418 |
| Flexural Strength (kgf/cm$^2$) | 902 | 883 | 1090 | 735 | 873 | 803 | 706 |

TABLE 2

Urethane Resin Composition

|  | Example 3 Sample c | Example 4 Sample d | Compara. Example 6 Sample m | Compara. Example 7 Sample n | Compara. Example 8 Sample p | Compara. Example 9 Sample q |
|---|---|---|---|---|---|---|
| Flame Retardancy |  |  |  |  |  |  |
| UL-94V 1.6 mm$^t$ | V-0 | V-0 | burning | burning | V-0 | burning |
| O.I. 3.0 mm$^t$ | 28 | 31 | 19.0 | 28.2 | 31.1 | 27.4 |
| Surface Resistivity ($\Omega$): |  |  |  |  |  |  |
| Before hot water immersion | $5.2 \times 10^{15}$ | $3.9 \times 10^{15}$ | $3.2 \times 10^{16}$ | $9.4 \times 10^{16}$ | $4.7 \times 10^{16}$ | $2.8 \times 10^{15}$ |
| After hot water immersion | $4.9 \times 10^{15}$ | $6.3 \times 10^{14}$ | $2.7 \times 10^{15}$ | $3.1 \times 10^{8}$ | $3.5 \times 10^{10}$ | $1.9 \times 10^{15}$ |
| Bleed Resistance | good | good | good | poor | poor | good |

TABLE 2-continued

| | Urethane Resin Composition | | | | | |
|---|---|---|---|---|---|---|
| | Example 3 Sample c | Example 4 Sample d | Compara. Example 6 Sample m | Compara. Example 7 Sample n | Compara. Example 8 Sample p | Compara. Example 9 Sample q |
| Tensile Strength (kgf/cm$^2$) | 101 | 102 | 79 | 105 | 111 | 85 |
| Flexural Strength (kgf/cm$^2$) | 105 | 98 | 110 | 86 | 83 | 6.5 |

TABLE 3

| | Melamine Resin Composition | | | Phenolic Resin Composition | | | |
|---|---|---|---|---|---|---|---|
| | Example 5 Sample e | Compara. Example 10 Sample r | Compara. Example 11 Sample s | Example 6 Sample f | Example 7 Sample q | Compara. Example 12 Sample t | Compara. Example 13 Sample u |
| Flame Retardancy | | | | | | | |
| UL-94V 1.6 mm$^t$ | V-0 | V-0 | V-0 | V-0 | V-0 | burning | V-0 |
| O.I. 3.0 mm$^t$ | 64.8 | 43.9 | 64.2 | 44.5 | 37.2 | 29.0 | 45.2 |
| Surface Resistivity ($\Omega$): | | | | | | | |
| Before hot water immersion | $1.3 \times 10^{12}$ | $9.4 \times 10^{12}$ | $2.0 \times 10^{11}$ | $1.8 \times 10^{12}$ | $1.8 \times 10^{12}$ | $5.5 \times 10^{12}$ | $3.9 \times 10^{12}$ |
| After hot water immersion | $2.9 \times 10^{11}$ | $5.0 \times 10^{12}$ | $3.1 \times 10^{8}$ | $2.5 \times 10^{11}$ | $2.5 \times 10^{12}$ | $4.6 \times 10^{11}$ | $3.1 \times 10^{8}$ |
| Bleed Resistance | good | good | poor | good | good | good | poor |
| Tensile Strength (kgf/cm$^2$) | 585 | 690 | 312 | 390 | 440 | 460 | 218 |
| Flexural Strength (kgf/cm$^2$) | 1090 | 1380 | 650 | 830 | 900 | 911 | 620 |

Containing no ammonium polyphosphate, the epoxy resin composition of Comparative Example 1 exhibits no flame retardancy. The epoxy resin compositions of Comparative Examples 2 and 3 containing ammonium polyphosphate particles (SUMISAFE-P) or ammonium polyphosphate (crystal form II) fine particles as a flame-retardant undergo a serious reduction in surface resistivity due to hot-water immersion and suffer from elution or bleeding of the flame-retardant. The epoxy resin composition of Comparative Example 4 has deteriorated mechanical properties, although it is flame-retardant, undergoes no reduction in surface resistivity even when immersed in hot water, and has satisfactory bleed resistance. The epoxy resin composition of Comparative Example 5 contains magnesium hydroxide (KISUMA 5A) as a flame-retardant in a proportion as high as 50% but still fails to have flame retardancy. To the contrary, the epoxy resin compositions of Examples 1 and 2 containing melamine-coated ammonium polyphosphate particles exhibit high flame retardancy and satisfactory bleed resistance, while suppressing reduction in mechanical properties.

The above considerations also apply to the thermosetting resin compositions of Examples 3 to 7 and Comparative Examples 6 to 13.

REFERENCE EXAMPLE 1

Preparation of Water-Insoluble Ammonium Polyphosphate Particles

In a 5 l kneader equipped with a heating and Kneading means and a degassing means were charged 1000 g of melamine-coated ammonium polyphosphate particles and 120 g of 37% formalin, mixed at room temperature for 30 minutes, and further mixed at 100° C. for an additional period of 1 hour to obtain 1005 g of insoluble ammonium polyphosphate particles in which about 50% of the active hydrogen atoms belonging to the amino group of the melamine present in the melamine coating of the melamine-coated ammonium polyphosphate particles was crosslinked with an aldehyde group. The resulting particles are designated water-insoluble ammonium polyphosphate particles (A).

REFERENCE EXAMPLE 2

Preparation of Water-Insoluble Ammonium Polyphosphate Particles

In a 5 l flask equipped with a heating and kneading means and a refluxing means were charged 1000 g of melamine-coated ammonium polyphosphate particles and 900 g of toluene. Then, 132 g of hexamethylene diisocyanate and 2.6 g of NIKKA OCTHIX "Sn" (metal content 28%) catalyst were added thereto, followed by mixing at room temperature. The temperature was elevated to the refluxing temperature, at which the mixture was further mixed for 2 hours. After cooling, the mixture was filtered and dried in a drier at 100° C. for 1 hour to obtain 1080 g of insoluble ammonium polyphosphate particles in which about 50% of the active hydrogen atoms belonging to the amino group of the melamine present in the melamine coating of the melamine-coated ammonium polyphosphate particles was crosslinked with an isocyanate group. The resulting particles are designated water-insoluble ammonium polyphosphate particles (B).

EXAMPLE 8

A mixture of 71.2 parts of a bisphenol A type epoxy resin EPIKOTE 828 and 20 parts of water-insoluble ammonium polyphosphate particles (A) obtained in Reference Example 1 was thoroughly mixed, and 8.8 parts of diethylenetriamine was added thereto as a curing agent, followed by thoroughly mixing. After degassing, the mixture was heated at 30° C. for 60 minutes and hot press molded at 100° C. for 15 minutes to prepare a flat plate. Test pieces of prescribed sizes (hereinafter designated sample A) were cut out of the plate and subjected to a flame retardancy test, measurement of O.I., a hot-water immersion test, a tensile test, and a bending test. The results obtained are shown in Table 4.

EXAMPLE 9

Test pieces (hereinafter designated sample B) were prepared and tested in the same manner as in Example 8, except for using a resin composition consisting of 71.2 parts of EPIKOTE 828, 20 parts of water-insoluble ammonium polyphosphate particles (B) obtained in Reference Example 2, and 8.8 parts of diethylenetriamine. The results of the tests are shown in Table 4.

EXAMPLE 10

A mixture of 51 parts of a polyisocyanate compound DN-980S, 49 parts of a polyester polyol D-220, and 13 parts of water-insoluble ammonium polyphosphate particles (A) obtained in Reference Example 1 was thoroughly dispersed. After degassing, the mixture was hot press molded at 150° C. for 30 minutes to prepare a flat plate. Test pieces of prescribed sizes (hereinafter designated sample C) were cut out of the plate and subjected to a flame retardancy test, measurement of O.I., a hot-water immersion test, and a tensile test. The results obtained are shown in Table 5.

EXAMPLE 11

Test pieces (hereinafter designated sample D) were prepared and tested in the same manner as in Example 10, except for changing the amount of the water-insoluble ammonium polyphosphate particles (A) to 20 parts. The results of the tests are shown in Table 5.

EXAMPLE 12

A mixture of 87 parts of a molding melamine resin (containing cellulose powder), produced by Fuji Kasei K.K., and 13 parts of water-insoluble ammonium polyphosphate particles (A) obtained in Reference Example 1 was hot press molded at 165° C. for 4 minutes to prepare a flat plate. Test pieces of prescribed sizes (hereinafter designated sample E) were cut out of the plate and subjected to a flame retardancy test, measurement of O.I., a hot-water immersion test, a tensile test, and a bending test. The results obtained are shown in Table 6.

EXAMPLE 13

A mixture of 90 parts of a molding phenolic resin (containing cellulose powder), produced by Fudo K.K., and 10 parts of water-insoluble ammonium polyphosphate particles (A) obtained in Reference Example 1 was hot press molded at 170° C. for 4 minutes to prepare a flat plate. Test pieces of prescribed sizes (hereinafter designated sample F) were cut out of the plate and subjected to a flame retardancy test, measurement of O.I., a hot-water immersion test, a tensile test, and a bending test. The results obtained are shown in Table 6.

EXAMPLE 14

A mixture of 94 parts of a molding phenolic resin (containing cellulose powder), produced by Fudo K.K., and 6 parts of water-insoluble ammonium polyphosphate particles (B) obtained in Reference Example 2 was hot press molded at 170° C. for 4 minutes to prepare a flat plate. Test pieces of prescribed sizes (hereinafter designated sample G) were cut out of the plate and subjected to a flame retardancy test, measurement of O.I., a hot-water immersion test, a tensile test, and a bending test. The results obtained are shown in Table 6.

COMPARATIVE EXAMPLE 14

Test pieces (hereinafter designated sample I) were prepared and tested in the same manner as in Example 8, except for replacing the water-insoluble ammonium polyphosphate particles (A) with 20 parts of ammonium polyphosphate (crystal form II) fine particles. The results of the tests are shown in Table 4.

COMPARATIVE EXAMPLE 15

Test pieces (hereinafter designated sample J) were prepared and tested in the same manner as in Example 8, except for replacing the insoluble ammonium polyphosphate particles (A) with 20 parts of ammonium polyphosphate EXOLIT-462. The results of the tests are shown in Table 4.

COMPARATIVE EXAMPLE 16

Test pieces (hereinafter designated sample K) were prepared and tested in the same manner as in Example 8, except for replacing the insoluble ammonium polyphosphate particles (A) with 80 parts of magnesium hydroxide KISUMA 5A. The results of the tests are shown in Table 4.

COMPARATIVE EXAMPLE 17

Test pieces (hereinafter designated sample M) were prepared and tested in the same manner as in Example 10, except for replacing the water-insoluble ammonium polyphosphate particles (A) with 20 parts of ammonium polyphosphate (crystal form II) fine particles. The results of the tests are shown in Table 5.

COMPARATIVE EXAMPLE 18

Test pieces (hereinafter designated sample N) were prepared and tested in the same manner as in Example 10, except for replacing the water-insoluble ammonium polyphosphate particles (A) with 100 parts of magnesium hydroxide KISUMA 5A. The results of the tests are shown in Table 5.

COMPARATIVE EXAMPLE 19

Test pieces (hereinafter designated sample Q) were prepared and tested in the same manner as in Example 12, except for replacing the water-insoluble ammonium polyphosphate particles (A) with 13 parts of ammonium polyphosphate SUMISAFE-P. The results of the tests are shown in Table 6.

COMPARATIVE EXAMPLE 20

Test pieces (hereinafter designated sample S) were prepared and tested in the same manner as in Example 13, except for replacing the water-insoluble ammonium polyphosphate particles (A) with 10 parts of ammonium polyphosphate SUMISAFE-P. The results of the tests are shown in Table 6.

TABLE 4

Epoxy Resin Composition

|  | Example 8 Sample A | Example 9 Sample B | Compara. Example 1 Sample h | Compara. Example 14 Sample I | Compara. Example 15 Sample J | Compara. Example 16 Sample K |
|---|---|---|---|---|---|---|
| Flame Retardancy | | | | | | |
| UL-94V 1.6 mm$^t$ | V-0 | V-0 | burning | V-0 | V-0 | burning |
| O.I. 3.0 mm$^t$ | 32.0 | 31.8 | 20.0 | 30.0 | 30.5 | 25.9 |
| Surface Resistivity ($\Omega$): | | | | | | |
| Before hot water immersion | $2.6 \times 10^{16}$ | $4.1 \times 10^{16}$ | $4.2 \times 10^{16}$ | $3.8 \times 10^{14}$ | $2.8 \times 10^{15}$ | $1.8 \times 10^{16}$ |
| After hot water immersion | $3.3 \times 10^{16}$ | $5.8 \times 10^{16}$ | $5.0 \times 10^{15}$ | $3.1 \times 10^{8}$ | $5.1 \times 10^{15}$ | $1.8 \times 10^{16}$ |
| Bleed Resistance | good | good | good | poor | good | good |
| Tensile Strength (kgf/cm$^2$) | 508 | 501 | 472 | 403 | 400 | 418 |
| Flexural Strength (kgf/cm$^2$) | 892 | 895 | 1090 | 873 | 803 | 706 |

TABLE 5

Urethane Resin Composition

|  | Example 10 Sample C | Example 11 Sample D | Compara. Example 6 Sample m | Compara. Example 17 Sample M | Compara. Example 18 Sample N |
|---|---|---|---|---|---|
| Flame Retardancy | | | | | |
| UL-94V 1.6 mm$^2$ | V-0 | V-0 | burning | V-0 | burning |
| O.I. 3.0 mm$^t$ | 28.2 | 31.5 | 19.0 | 31.1 | 27.4 |
| Surface Resistivity ($\Omega$): | | | | | |
| Before hot water immersion | $7.4 \times 10^{15}$ | $2.9 \times 10^{15}$ | $3.2 \times 10^{16}$ | $4.7 \times 10^{16}$ | $2.8 \times 10^{16}$ |
| After hot water immersion | $5.6 \times 10^{15}$ | $4.6 \times 10^{15}$ | $2.7 \times 10^{15}$ | $3.5 \times 10^{10}$ | $1.9 \times 10^{16}$ |
| Bleed Resistance | good | good | good | poor | good |
| Tensile Strength (kgf/cm$^2$) | 102 | 105 | 79 | 111 | 85 |
| Tensile Elongation (%) | 104 | 96 | 110 | 83 | 6.5 |

TABLE 6

|  | Melamine Resin Composition | | | Phenolic Resin Composition | | | |
|---|---|---|---|---|---|---|---|
|  | Example 12 Sample r | Compara. Example 10 Sample r | Compara. Example 19 Sample Q | Example 13 Sample F | Example 14 Sample G | Compara. Example 12 Sample t | Compara. Example 20 Sample s |
| Flame Retardancy | | | | | | | |
| UL-94V 1.6 mm$^t$ | V-0 | V-0 | V-0 | V-0 | V-0 | burning | V-0 |
| O.I. 3.0 mm$^t$ | 63.7 | 43.9 | 64.2 | 39.5 | 37.7 | 29.0 | 39.3 |
| Surface Resistivity ($\Omega$): | | | | | | | |
| Before hot water immersion | $1.9 \times 10^{12}$ | $9.4 \times 10^{12}$ | $2.0 \times 10^{11}$ | $2.6 \times 10^{12}$ | $1.5 \times 10^{12}$ | $5.5 \times 10^{12}$ | $3.3 \times 10^{12}$ |
| After hot water immersion | $7.2 \times 10^{11}$ | $5.0 \times 10^{12}$ | $3.1 \times 10^{8}$ | $2.2 \times 10^{12}$ | $6.3 \times 10^{12}$ | $4.6 \times 10^{11}$ | $4.3 \times 10^{8}$ |
| Bleed Resistance | good | good | poor | good | good | good | poor |
| Tensile Strength (kgf/cm$^2$) | 565 | 690 | 312 | 400 | 440 | 460 | 222 |
| Flexural Strength (kgf/cm$^2$) | 1030 | 1380 | 650 | 840 | 890 | 911 | 650 |

Containing no ammonium polyphosphate, the epoxy resin composition of Comparative Example 1 exhibits no flame retardancy. The epoxy resin composition of Comparative Example 14 containing ammonium polyphosphate (crystal form II) fine particles as a flame-retardant undergoes a serious reduction in surface resistivity due to hot-water immersion and suffers from elution or bleeding of the flame-retardant. The epoxy resin composition of Comparative Example 15 has deteriorated mechanical properties, although it is flame-retardant, undergoes no reduction in surface resistivity even when immersed in hot water, and has satisfactory bleed resistance. The epoxy resin composition of Comparative Example 16 contains magnesium hydroxide (KISUMA 5A) as a flame-retardant in a proportion as high as 50% but still fails to have flame retardancy. To the contrary, the epoxy resin compositions of Examples 8 and 9 containing water-insoluble ammonium polyphosphate particles exhibit high flame retardancy and satisfactory bleed resistance, while suppressing reductions in mechanical properties.

The above considerations also apply to the thermosetting resin compositions of Examples 10 to 14 and Comparative Examples 17 to 20.

Examples and Comparative Examples are further shown below to illustrate the other embodiments of the present invention in greater detail, but the present invention should not be construed as being limited thereto. All the percents are given by weight unless otherwise indicated. Evaluation was effected in accordance with the following methods.

(1) Measurement of Stability to Hydrolysis:

A water-soluble content in the product was quantitatively determined as follows. 1 g of ammonium polyphosphate particles obtained was suspended in 99 g of pure water to prepare a 1% suspension. The suspension was stirred at 25° C., 50° C. or 75° C. for 1 hour and centrifuged. The supernatant liquid was filtered through filter paper having a pore size of 0.45 μm. An aliquot of the filtrate was put in a dish and evaporated to dryness in a drier. A water-soluble content was obtained from the residue to evaluate hydrolysis stability. The smaller the value, the higher the hydrolysis stability.

(2) Measurement of Average Particle Size:

Average particle size was measured in ethyl alcohol as a disperse medium with a laser diffraction/scattering type particle size distribution measuring apparatus LA-700, manufactured by Horiba Seisakusho.

Measurement of Mechanical Strength:

70% of a crystalline ethylene-propylene block copolymer having an ethylene content of 8.5% and a melt flow rate (a molten resin output for 10 minutes under a load of 2.16 kg at 230° C.) of 20 g/10 min as a polypropylene resin, 20% of ammonium polyphosphate produced, 10% of a polymer of 2-piperazinylene-4-morpholino-1,3,5-triazine, and, as additives, 0.15% of 2,6-di-t-butyl-p-cresol, 0.2% of dimyristyl thiodipropionate, and 0.1% of calcium stearate were put in Cooking Mixer (trade name) and mixed with stirring for 1 minute. The resulting mixture was extruded at a melt kneading temperature of 210° C. and pelletized using CSI-Max Mixing Extruder (Model CS-194A). The pellets were molded in a hot press with its maximum temperature set at 210° C. to obtain prescribed test pieces. An Izod impact test and a Du Pont impact test were carried out according to the following test methods.

(3) Izod Impact Test:

Izod Impact tests were performed in accordance with JIS K7110.

(4) Du Pont Impact Test:

A test specimen of 50×50×2 mm heated to 10° C. was tested using an impact tester specified in JIS K5400-8.3.2 under conditions of 10° C. in temperature of the sample, ¼ in. in radius of curvature of the impactor, and ½ in. in inner diameter of the impactor receiving pad. The load weight and the drop height were varied for evaluation.

(5) Infrared Spectroscopy:

The crosslinked structure on the surface of water-insoluble ammonium polyphosphate particles was observed by infrared spectrophotometry by KBr tablet method using a Fourier transform infrared spectrometer FTIR-4000, manufactured by Shimadzu Corporation.

The melamine-coated ammonium polyphosphate used in the following examples was prepared as follows.

In a kneader previously heated to 280° C. were charged 1800 g of ammonium polyphosphate having an average particle size of 6.4 μm and 200 g of melamine and mixed under heating for 4 hours without changing the form of the ammonium polyphosphate, to obtain 2000 g of melamine-coated ammonium polyphosphate. Observation under an electron microscope revealed that the surface of the individual ammonium polyphosphate particles was uniformly coated with melamine and the average particle size was 6.8 μm.

The above-mentioned ammonium polyphosphate having an average particle size of 6.4 μm was obtained by the following method.

In a 5 l table kneader preheated to 290° to 300° C. was charged a mixture of 660 g (5 mol) of diammonium hydrogenphosphate and 710 g (5 mol) of phosphorus pentoxide with stirring while maintaining a nitrogen atmosphere. After 20 minutes, 195 g of a 76.9% aqueous urea solution heated to 80° C. was added thereto by spraying. Subsequently, the mixture was heated at 250° to 300° C. for 2.5 hours in an ammonia atmosphere to obtain 1460 g of ammonium polyphosphate. Since the resulting ammonium polyphosphate was a mixture of primary particles and agglomerates of primary particles, it was ground in a grinder AP-B Model, manufactured by Hosokawa Micron Corp., in an ammonia atmosphere so as to separate the agglomerates into primary particles. There were obtained fine particles of ammonium polyphosphate (crystal form II) having an average particle size of 6.4 μm.

EXAMPLE 15

In a 5 l kneader equipped with a heating and kneading means and a degassing means were charged 1000 g of melamine-coated ammonium polyphosphate and 64.3 g of 37% formalin, followed by mixing at room temperature. The temperature was elevated to 100° C., at which the mixture was further maintained for 1 hour while degassing to obtain 1010 g of water-insoluble ammonium polyphosphate particles in which the surface of the melamine-coated ammonium polyphosphate particles was crosslinked.

EXAMPLE 16

In the same manner as in Example 15, except for changing the amount of formalin to 129 g, 1020 g of water-insoluble ammonium polyphosphate particles were obtained.

EXAMPLE 17

In a 5 l kneader equipped with a heating and kneading means and a degassing means were charged 1000 g of melamine-coated ammonium polyphosphate and 64.3 g of 37% formalin, followed by mixing at room temperature. The temperature was elevated to 150° C., at which the mixture was further maintained for 0.5 hour while degassing to obtain 1010 g of water-insoluble ammonium polyphosphate particles.

EXAMPLE 18

In a 5 l flask equipped with a heating and stirring means and a refluxing means were charged 1000 g of melamine-coated ammonium polyphosphate, 64.3 g of 37% formalin, 909 g of water, and 90.9 g of methyl alcohol, followed by mixing at room temperature. The temperature was elevated to 80° C., at which the mixture was maintained under reflux for 1 hour, followed by filtration. The filter cake was dried at 100° C. for 1 hour in a drier to obtain 1010 g of water-insoluble ammonium polyphosphate particles.

EXAMPLE 19

In the same manner as in Example 18, except for changing the amount of formalin to 129 g, 1020 g of water-insoluble ammonium polyphosphate particles were obtained.

EXAMPLE 20

In a 5 l flask equipped with a heating and stirring means and a refluxing means were charged 1000 g of melamine-coated ammonium polyphosphate, 92 g of 49% glyoxal, 909 g of water, and 90.9.g of methyl alcohol, followed by mixing at room temperature. The temperature was elevated to 80° C., at which the mixture was maintained under reflux for 2 hours, followed by filtration. The filter cake was dried at 100° C. for 1 hour in a drier to obtain 1025 g of water-insoluble ammonium polyphosphate particles in which the surface of the melamine-coated ammonium polyphosphate particles was crosslinked.

EXAMPLE 21

In a 5 l flask equipped with a heating and stirring means and a refluxing means were charged 1000 g of melamine-coated ammonium polyphosphate, 92 g of 1,6-hexane diisocyanate, 2.6 g of NIKKA OCTHIX "Sn", and 900 g of toluene, and the mixture was mixed at room temperature. The temperature was elevated to 120° C., at which the mixture was maintained under reflux for 2 hours, followed by filtration. The filter cake was dried at 120° C. for 1 hour in a drier to obtain 1080 g of water-insoluble ammonium polyphosphate particles in which the surface of the melamine-coated ammonium polyphosphate particles was crosslinked.

EXAMPLE 22

In a 5 l flask equipped with a heating and stirring means and a refluxing means were charged 900 g of melamine-coated ammonium polyphosphate and a mixed solvent of 600 g of water and 400 g of methyl alcohol, and the mixture was mixed at room temperature. Then, a separately prepared methylol melamine solution (prepared by adding 160 g of 37% formalin to 100 g of melamine, followed by stirring at 70° C. for 1 hour) was added thereto. The mixture was adjusted to pH 4.5 and allowed to react at a temperature of 75° C. for 2 hours to resinify the methylol melamine. After cooling, the reaction mixture was filtered, and the filter cake was dried at 100° C. for 1 hour to obtain 1025 g of water-insoluble ammonium polyphosphate particles in which the surface of the melamine-coated ammonium polyphosphate particles was crosslinked.

COMPARATIVE EXAMPLE 21

In a kneader set at 270° C. was charged a material mixture consisting of 1150 g of ammonium phosphate, 601 g of urea, 631 g of melamine, and the mixture was heated at that temperature for 1.5 hours in an ammonia gas atmosphere to obtain 1540 g of modified ammonium polyphosphate.

COMPARATIVE EXAMPLE 22

In a 5 l flask equipped with a heating and stirring means and a refluxing means was put a mixed solution of 1200 g of water and 300 g of methyl alcohol, and 1000 g of ammonium polyphosphate (EXOLIT-422, a registered trademark,. produced by Hoechst AG), 100 g of a melamine-formaldehyde pre-condensate (NIKARESIN S-305, a registered trademark, produced by Nippon Carbide Industries Co., Ltd.), and 5 g of a curing agent (CATANITTO A, a registered trademark, produced by Nitto Chemical Industry Co., Ltd.) were added thereto to prepare a suspension. The suspension was heated to 83° C., at which it was allowed to react for 1 hour, cooled, and filtered. The filter cake was washed with methyl alcohol and dried at 100° C. in a nitrogen atmosphere to obtain 1050 g of melamine formaldehyde resin-treated ammonium polyphosphate.

COMPARATIVE EXAMPLE 23

In a 5 l flask equipped with a heating and stirring means and a refluxing means were put 1000 g of ammonium polyphosphate (EXOLIT-422, a registered trademark, produced by Hoechst AG) and a mixed solvent of 120 g of water and 300 g of methyl alcohol, followed by mixing at room temperature. A separately prepared methylol melamine solution (prepared by adding 160 g of 37% formalin to 100 g of melamine, followed by stirring at 70° C. for 1 hour to dissolve) was added thereto. The mixture was adjusted to pH 4.5 and allowed to react at a temperature of 83° C. for 1 hour to resinify the methylol melamine. After cooling, the reaction mixture was filtered, and the filter cake was dried at 100° C. in a nitrogen atmosphere to obtain 1080 g of ammonium polyphosphate particles in which a melamine formaldehyde resin was adhered to the surface of the particles.

COMPARATIVE EXAMPLE 24

In a 5 l kneader equipped with a heating and kneading means and a degassing means were charged 1000 g of melamine-coated ammonium polyphosphate and 64.3 g of 37% formalin, followed by mixing at room temperature. The temperature was elevated to 50° C,, at which the mixture was maintained for 1 hour while degassing. However, no crosslinked structure was formed on the surface of the melamine-coated ammonium polyphosphate particles.

COMPARATIVE EXAMPLE 25

In a 5 l kneader equipped with a heating and kneading means and a degassing means were charged 1000 g of melamine-coated ammonium polyphosphate and 64.3 g of 37% formalin, followed by mixing at room temperature. The temperature was elevated to 250° C., at which the mixture was maintained for 1 hour while degassing. Water-insoluble ammonium polyphosphate particles in which the surface of the melamine-coated ammonium polyphosphate particles was crosslinked were obtained. However, expected hydrolysis stability was not obtained due to release of ammonia added to the water-insoluble ammonium polyphosphate particles.

COMPARATIVE EXAMPLE 26

In a 5 l kneader equipped with a heating and kneading means and a degassing means were charged 1000 g of melamine-coated ammonium polyphosphate particles and 6.4 g of 37% formalin, followed by mixing at room temperature. The temperature was elevated to 100° C., at which the mixture was maintained for 1 hour while degassing to obtain 1002 g of water-insoluble ammonium polyphosphate particles in which the surface of the melamine-coated ammonium polyphosphate particles was crosslinked.

COMPARATIVE EXAMPLE 27

In a 5 l flask equipped with a heating and stirring means and a refluxing means were charged 1000 g of melamine-coated ammonium polyphosphate, 6.4 g of 37% formalin, 909 g of water, and 90.9 g of methyl alcohol, followed by mixing at room temperature. The temperature was elevated to 80° C., at which the mixture was maintained under reflux for 1 hour, followed by filtration. The filter cake was dried at 100° C. for 1 hour in a drier to obtain 1002 g of water-insoluble ammonium polyphosphate particles in which the surface of the melamine-coated ammonium polyphosphate particles was crosslinked.

COMPARATIVE EXAMPLE 28

In a 5 l table kneader preheated to 300° C. was charged a mixture of 660 g (5 mol) of diammonium hydrogenphosphate and 710 g (5 mol) of phosphorus pentoxide and stirred while maintaining a nitrogen atmosphere. After 20 minutes, 195 g of a 76.9% aqueous urea solution heated to 80° C. was added thereto by spraying. Subsequently, the mixture was heated at 270° C. for 2.5 hours in an ammonia atmosphere to obtain 1460 g of ammonium polyphosphate having crystal form II.

COMPARATIVE EXAMPLE 29

In a kneader preheated to 280° C. were charged 1800 g of the ammonium polyphosphate obtained in accordance with Comparative Example 28 and 200 g of melamine and mixed under heating for 4 hours without changing the form of the ammonium polyphosphate to obtain 2000 g of melamine-coated ammonium polyphosphate.

The average particle size and hydrolysis stability of the ammonium polyphosphate obtained in the foregoing Examples 15 to 22 and Comparative Examples 21 to 29 were evaluated. The results obtained are shown in Table 7.

An Izod impact test and a Du Pont impact test were conducted using the ammonium polyphosphate particles obtained in Examples 15 and 16 and Comparative Examples 21 and 22 in accordance with the above-described test methods. The results obtained are shown in Table 8 together with the average particle size of the particles tested.

Figure 2:
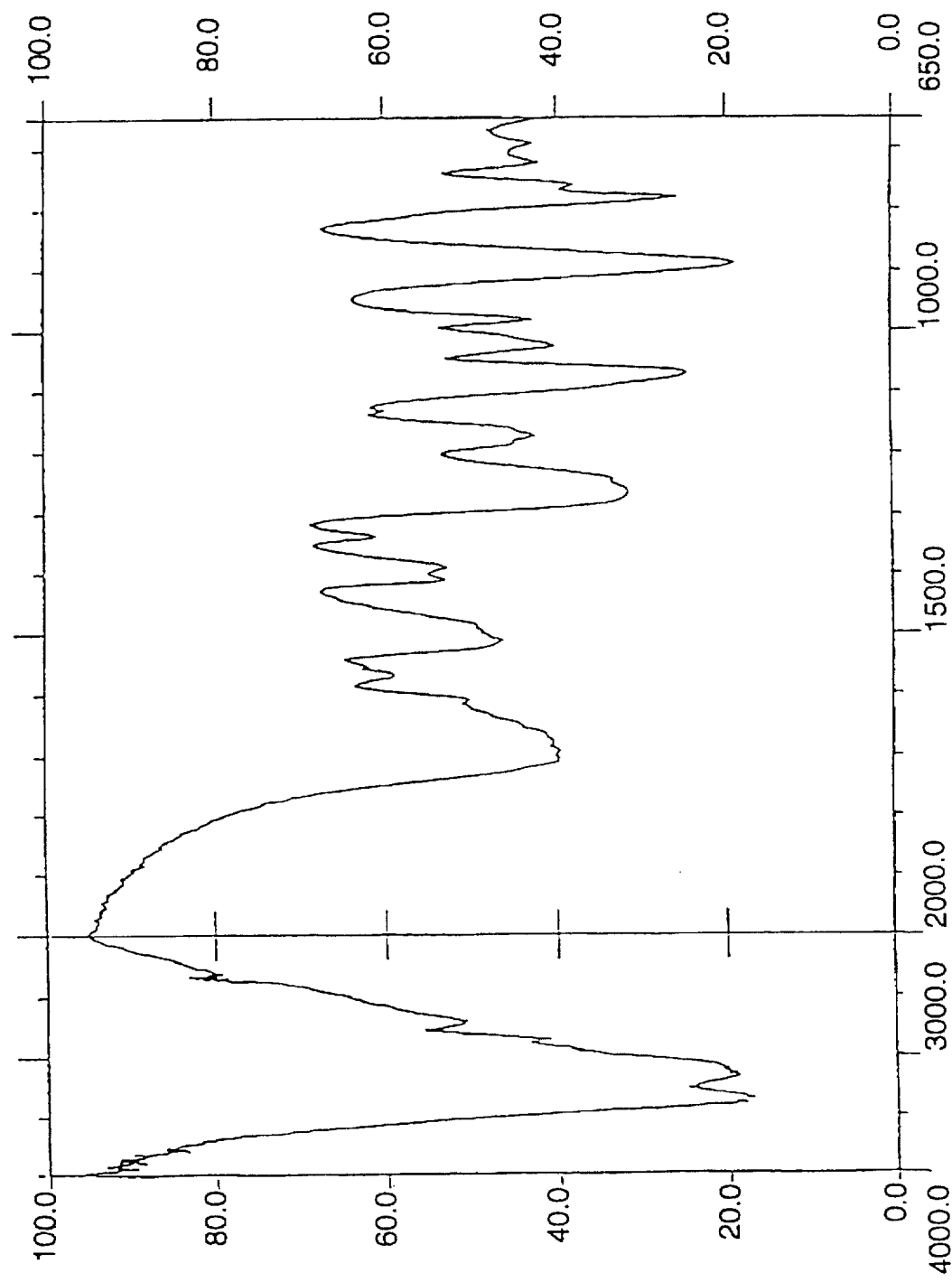
FIG. 2 shows an infrared absorption spectrum of the surface of the melamine-coated ammonium polyphosphate particle used in each of Examples 15 to 22.

The surface of the water-insoluble ammonium polyphosphate particles obtained in Example 15 was observed by infrared spectroscopy. The results are shown in FIG. 1. In FIG. 2 are shown the results of infrared spectroscopic observation of the surface of the melamine-coated ammonium polyphosphate used in each of Examples 15 to 22.

On comparing the infrared absorption spectrum of the water-insoluble ammonium polyphosphate particle surface shown in FIG. 1 with that of the melamine-coated ammonium polyphosphate particle surface shown in FIG. 2, the former shows an absorption by C-H at 1180 cm$^{-1}$ due to twisting vibration and wagging vibration of a methylene bond on the surface of the particles, which is attributed to the crosslinked structure.

TABLE 7

| Product | Average Particle Size (μm) | Water-Soluble Content (%) | | |
|---|---|---|---|---|
| | | 25° C. | 50° C. | 75° C. |
| Example 15 | 6.8 | 1.0 | 3.0 | 7.0 |
| Example 16 | 6.8 | 1.0 | 3.0 | 7.0 |
| Example 17 | 6.8 | 1.0 | 3.0 | 7.0 |
| Example 18 | 6.8 | <0.1 | 0.5 | 1.5 |
| Example 19 | 6.8 | <0.1 | 0.5 | 1.5 |
| Example 20 | 6.8 | 1.0 | 2.0 | 5.0 |
| Example 21 | 6.8 | 1.0 | 2.0 | 5.0 |
| Example 22 | 6.8 | <0.1 | 0.7 | 3.5 |
| Comparative Example 21 | 30 | 8.0 | 40 | 100 |
| Comparative Example 22 | 30 | 1.2 | 3.8 | 24 |
| Comparative Example 23 | 20 | 5.0 | 23 | 64 |
| Comparative Example 24 | 6.8 | 1.7 | 7.3 | 58 |
| Comparative Example 25 | 6.8 | 2.0 | 8.2 | 62 |
| Comparative Example 26 | 6.8 | 1.4 | 4.8 | 36 |
| Comparative Example 27 | 6.8 | 1.2 | 3.5 | 22 |
| Comparative Example 28 | 6.4 | 18 | 51 | 100 |
| Comparative Example 29 | 6.8 | 1.7 | 7.3 | 58 |

TABLE 8

| Product | Average Particle Size (μm) | Izod Impact Strength (kg · cm/cm) | Du Pont Impact Strength (10° C.) |
|---|---|---|---|
| Example 15 | 6.8 | 5.5 | 80 |
| Example 16 | 6.8 | 5.5 | 80 |
| Comparative Example 21 | 30 | 3.5 | 20 |
| Comparative Example 22 | 30 | 3.5 | 20 |

As described and demonstrated above, the flame-retardant thermosetting resin compositions according to the present invention, which contain (1) melamine-coated ammonium polyphosphate particles and/or (2) water-insoluble ammonium polyphosphate particles as a flame-retardant, produce no halogenous gas, suffer from no elution or bleeding of the flame-retardant (1) and/or (2), and undergo little reduction in mechanical properties. Hence, the flame-retardant thermosetting resin compositions of the present invention are suitable for wide use as, for example, a molding material for electric and electronic parts, constructional materials and automobile parts, a coating, an adhesive, and an impregnating resin for impregnated paper. The water-insoluble ammonium polyphosphate particles according to the present invention are excellent in stability against hydrolysis and, when incorporated as a flame-retardant component into thermoplastic resins, thermosetting resins, coatings or paper, cause no reduction in mechanical strength of fine products and is, therefore, suited for use as a flame-retardant. According to the process of the present invention, since the reaction between melamine and a crosslinking agent having a functional group capable of reacting with active hydrogen atoms belonging to the amino group in melamine molecules takes place on the surface of individual melamine-coated ammonium polyphosphate particles, the process incurs no substantial increase in average particle size and provides water-insoluble ammonium polyphosphate particles having an average particle size of not greater than 15 μm with high efficiency.

While the invention has been described in detail and with reference to specific examples thereof, it will be apparent to one skilled in the art that various changes and modifications can be made therein without departing from the spirit and scope thereof.

What is claimed is:

1. Water-insoluble ammonium polyphosphate particles comprising melamine-coated ammonium polyphosphate particles with the surface thereof being crosslinked by a reaction between melamine molecules of the melamine-coated ammonium polyphosphate particles and a crosslinking agent having a functional group capable of reacting with the active hydrogen atoms belonging to the amino group in the melamine molecules.

2. The water-insoluble ammonium polyphosphate particles as claimed in claim 1, wherein an average particle size of the water-insoluble ammonium polyphosphate particles is not more than 15 μm.

3. The water-insoluble ammonium polyphosphate particles as claimed in claim 1 wherein said melamine-coated ammonium polyphosphate particles contain 0.5 to 20% by weight of melamine, based on the weight of the ammonium polyphosphate particles.

4. The water-insoluble ammonium polyphosphate particles as claimed in claim 1 wherein the melamine molecules of said melamine-coated ammonium polyphosphate particles are chemically bonded to the surface of ammonium polyphosphate particles.

5. The water-insoluble ammonium polyphosphate particles as claimed in claim 1 wherein said crosslinking agent having a functional group capable of reacting with active hydrogen atoms belonging to the amino group in the melamine molecules has an isocyanate group, a glycidyl group, a carboxyl group, a methylol group or an aldehyde group.

6. The water-insoluble ammonium polyphosphate particles as claimed in claim 1 wherein said cross-linking agent having a functional group capable of reacting with active hydrogen atoms belonging to the amino group in the melamine molecules has two or more functional groups.

7. The water-insoluble ammonium polyphosphate particles as claimed in claim 1 wherein the functional group of the cross-linking agent is selected from the group consisting of an isocyanate group, a hydroxymethyl group, a formyl group and an epoxy group.

8. The water-insoluble ammonium polyphosphate particles as claimed in claim 1 wherein the cross-linking agent includes at least 0.5 equivalents of functional groups per amino group in the melamine molecules.

9. The water-insoluble ammonium polyphosphate particles as claimed in claim 1 wherein the cross-linking agent includes from 0.5 to 6 equivalents of functional groups per amino group in the melamine molecules.

10. The water-insoluble ammonium polyphosphate particles as claimed in claim 1 wherein the ammonium polyphosphate contains less than a stoichiometric amount of ammonia.

11. The water-insoluble ammonium polyphosphate particles as claimed in claim 10 wherein the melamine molecules of said melamine-coated ammonium polyphosphate particles are chemically bonded to the surface of ammonium polyphosphate particles.

12. The water-insoluble ammonium polyphosphate particles as claimed in claim 11 wherein the melamine molecules of the melamine-coated ammonium polyphosphate particles are bonded to protons of oxygen-proton bonds of the ammonium polyphosphate.

* * * * *